United States Patent [19]

Pater

[11] Patent Number: 5,171,822

[45] Date of Patent: Dec. 15, 1992

[54] LOW TOXICITY HIGH TEMPERATURE PMR POLYIMIDE

[75] Inventor: Ruth H. Pater, Yorktown, Va.

[73] Assignee: The United States of America as represented by the Administrator of National Aeronautics and Space Administration, Washington, D.C.

[21] Appl. No.: 651,062

[22] Filed: Feb. 5, 1991

[51] Int. Cl.$^5$ ................ C08G 73/10; C08G 8/02; C08G 69/26

[52] U.S. Cl. ................ 528/188; 528/125; 528/126; 528/128; 528/170; 528/172; 528/173; 528/176; 528/183; 528/185; 528/220; 528/229; 528/350; 528/351; 528/353

[58] Field of Search ............ 528/188, 183, 185, 125, 528/126, 128, 173, 172, 170, 176, 220, 229, 351, 350, 353

[56] References Cited

U.S. PATENT DOCUMENTS 4,956,450  9/1990  Lee et al. .................... 528/125
5,015,727  5/1991  Riel et al. ................... 528/125

*Primary Examiner*—John Kight, III
*Assistant Examiner*—P. Hampton-Hightower
*Attorney, Agent, or Firm*—George F. Helfrich

[57] ABSTRACT

An improved low toxicity polymerization of monomer reactants (PMR) system has 3,4'-oxydianiline as the key monomer reactant. One variation of this system, LaRC-RP46, is prepared by reacting together monomethyl ester or 5-norbornene-2,3-dicarboxylic acid (NE), 3,4'-oxydianiline (3,4'-ODA), and dimethyl ester of 3,3',4,4'-benzophenonetetracarboxylic acid (BTDE); this combination is then treated with heat. This new matrix resin is readily processed into a high quality graphite fiber reinforced composite with excellent reproducibility. The flexibility of the ether linkage in 3,4'-ODA provides high toughness. The composite retains excellent mechanical properties both at 316° C. and at 371° C. The development of LaRC-RP46 will significantly extend the applications of PMR type polyimides.

16 Claims, 7 Drawing Sheets

LOW TOXICITY HIGH TEMPERATURE PMR POLYIMIDE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to high temperature polymers. It relates particularly to a PMR polyimide approach to the obtainment of tough, low toxicity, easy-to-process high temperature polymers.

2. Description of the Related Art

In-situ polymerization of monomer reactants (PMR) type polyimides constitute an important class of ultra high performance composite matrix resins. Their graphite fiber reinforced composite materials are finding increased use in various aircraft engine components, which operate at temperatures ranging from 232° C. to 371° C. for several hundred to several thousand hours. PMR-15 (15 stands for a formulated molecular weight of 1500 between crosslinks) is the best known and most widely used PMR polyimide. Its attributes include relatively easy processing, substantially lower costs, and excellent property retention at elevated temperatures, compared to other commercially available high temperature materials. This material is prepared from an alcohol solution of three monomers: monomethyl ester of 5-norbornene-2,3-dicarboxylic acid (NE), 4,4'-methylenedianiline (MDA), and dimethyl ester of 3,3', 4,4'-benzophenonetetracarboxylic acid (BTDE) as follows:

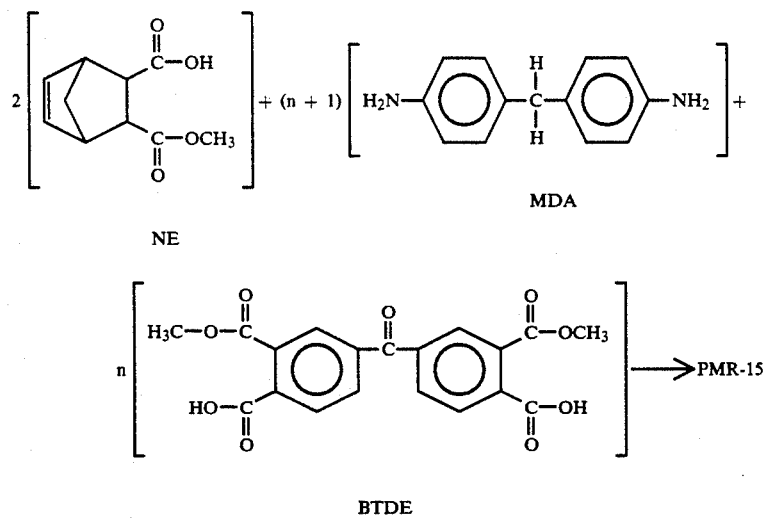

The monomer solution is impregnated into a reinforcing fiber, and in-situ polymerization of the monomer reactants occurs directly on the fiber surface to afford a composite material having good thermal and mechanical performance.

However, in recent years the health and safety problems of MDA and polymers derived from this diamine have become a great concern. On the basis of extensive testing data, NIOSH recommends that MDA be considered as a potential occupational carcinogen and that occupational exposure be minimized. (Current Intelligence Bulletin 47, NIOSA, Jul. 25, 1986). Increasing environmental restriction has, therefore, made the MDA containing PMR-15 less acceptable.

Attempts have been made to replace the MDA in PMR-15 with a less toxic diamine. However, when a diamine containing a non-benzylic linking group, such as ether or carbonyl, was used to replace MDA, the MDA-replaced material invariably exhibited significantly greater 316° C. resin weight loss, compared to MDA-based PMR-15, thus making the new material much less effective. ([W. B. Alston, Polymer Preprints, 27 (2) pp. 410-411 (1986); NASA TM-100791 AVSCOM TR-88-C-004, 1988; and Proceedings of the 18th International SAMPE Technical Conference, 18, pp. 1006-1014 (1986)] and P. Delvigs, D. L. Klupotek and P. J. Cavano, Proceedings of the Symposium on Polyimides and other high performance polymers sponsored by the ACS Polymer Chemistry Division, Jan. 22-25, 1990 in San Diego, CA). Other work has also been done in developing MDA-replaced PMR materials that show composite elevated temperature mechanical properties either comparable or significantly lower than PMR-15, particularly at 316° C. or higher temperatures. These new materials include British Petroleum's B1 formulation (N. D. Hoyle, et. al., Proceedings of the 22nd International SAMPE Technical Conference, 22 pp. 198-212 (1990)), Ferro's CPI-2310 (R. B. Baggett, H. K. Gupta and M. R. Kantz, Proceedings of the 35th International SAMPE Technical Conference, 35, pp. 1555-1565 (1990)), and United Technologies' 3,3'-DDS-PMR-16.5 (D. A. Scola, Proceedings of the High Temple Workshop, Cocoa Beach, FL, Jan. 29-Feb. 1, 1990).

Unlike MDA, 3,4'-oxydianiline (3,4'-ODA) has been found to exhibit no detectable mutagenicity according to the Ames TA 100 test with *salmonella typhimurium*. (W. D. Ross, et. al., NASA Contract Report 166085 (1983).) However, when the TA 98 method was used, moderate mutagenicity was detected for both 3,4'-ODA and MDA. From these tests, the conclusion can be drawn that 3,4'-ODA is at least potentially less toxic than MDA, and that a polymer made from 3,4'-ODA is potentially less toxic than one made with MDA. However, 3,4'-ODA has not been successfully used to make a useful PMR polyimide prior to the instant undertaking.

Powder technology has also been used in an attempt to eliminate the toxicity associated with MDA. In this case, the three monomer reactants of PMR-15 are converted into a fully imidized PMR-15 powder, which theoretically contains no free MDA. The powder is then used to prepare solventless prepreg, which is subsequently consolidated into a composite, using standard compression or autoclave molding techniques. (T. Hartness, D. Porter and J. P. Reardon, Proceedings of the 34th SAMPE Symposium, 34, pp. 112-126 (1989).) The composite fabricated from fully imidized PMR-15 showed mechanical properties that compared favorably with conventional solution processed counterparts, but with much less ease of processing.

One other approach has been used to develop an MDA-free PMR system. A new proprietary dimer is used to develop what is now called PMR-15-MDAF (MDA-free). (F. Riel, T. Vuong and E. Delaney, Patent Pending, Rohr Industries, appeared in *Performance Materials*, Oct. 1, 1990). The properties of this new material remain undisclosed, however.

None of these prior art products have disclosed the desired combination of properties set forth hereinabove, including greater ease of processing, such as a broader processing window, better reproducibility of high quality composite parts, better elevated temperature mechanical properties, and higher retention of mechanical properties at an elevated temperature, particularly, at 371° C.

SUMMARY OF THE INVENTION

This invention is a new composition of matter, a process for the production of that new composition, and a means of using that new composition.

It is a primary object of the present invention to provide what the prior art has been unable to produce-vis., a substantially improved high temperature PMR system that exhibits better processability, toughness, and thermo-oxidative stability than PMR-15, as well as having a low toxicity.

Another object of the present invention is to provide new PMR polyimides that are useful as adhesives, moldings, and composite matrices.

These primary objects and other objects and benefits are achieved by the formation of a novel PMR polyimide as disclosed in detail below.

Excellent results are achieved when the new PMR polyimide comprises a mixture of the following compounds: 3,4'-oxydianiline (3,4'-ODA), monomethyl ester of 5-norbornene-2,3-dicarboxylicacid (NE), and dimethyl ester of 3,3', 4,4'-benzophenonetetracarboxylic acid (BTDE), which are then treated with heat. This PMR polyimide has been designated LaRC-RP46.

The composite toughness of LaRC-RP46 determined by the standard double cantilever beam (DCB) test method showed an initial $G_{1c}$ value of 301 J/m$^2$, which increased with increasing exposure time at 316° C. The composite retains excellent properties both at 316° C. and at 371° C. The 371° C. initial flexural and interlaminar shear strengths were 115 ksi and 4.7 ksi, respectively. After aging 100-hours at 371° C. in air, the composite retained 90 percent and 100 percent of the 371° C. original strengths. The 371° C. flexural strengths suggest that LaRC-RP46 has significantly improved thermo-oxidative stability compared to the existing PMR composite materials, such as PMR-15, PMR-II-50, V-CAP-50 and AF-R-700B.

This new material is readily processed into a high quality graphite fiber reinforced composite with excellent reproducibility, and can be used as high performance, high temperature resistant adhesive, molding, and composite where low toxicity is a desired characteristic.

DESCRIPTION OF THE PREFERRED EMBODIMENTS

Figure 1:
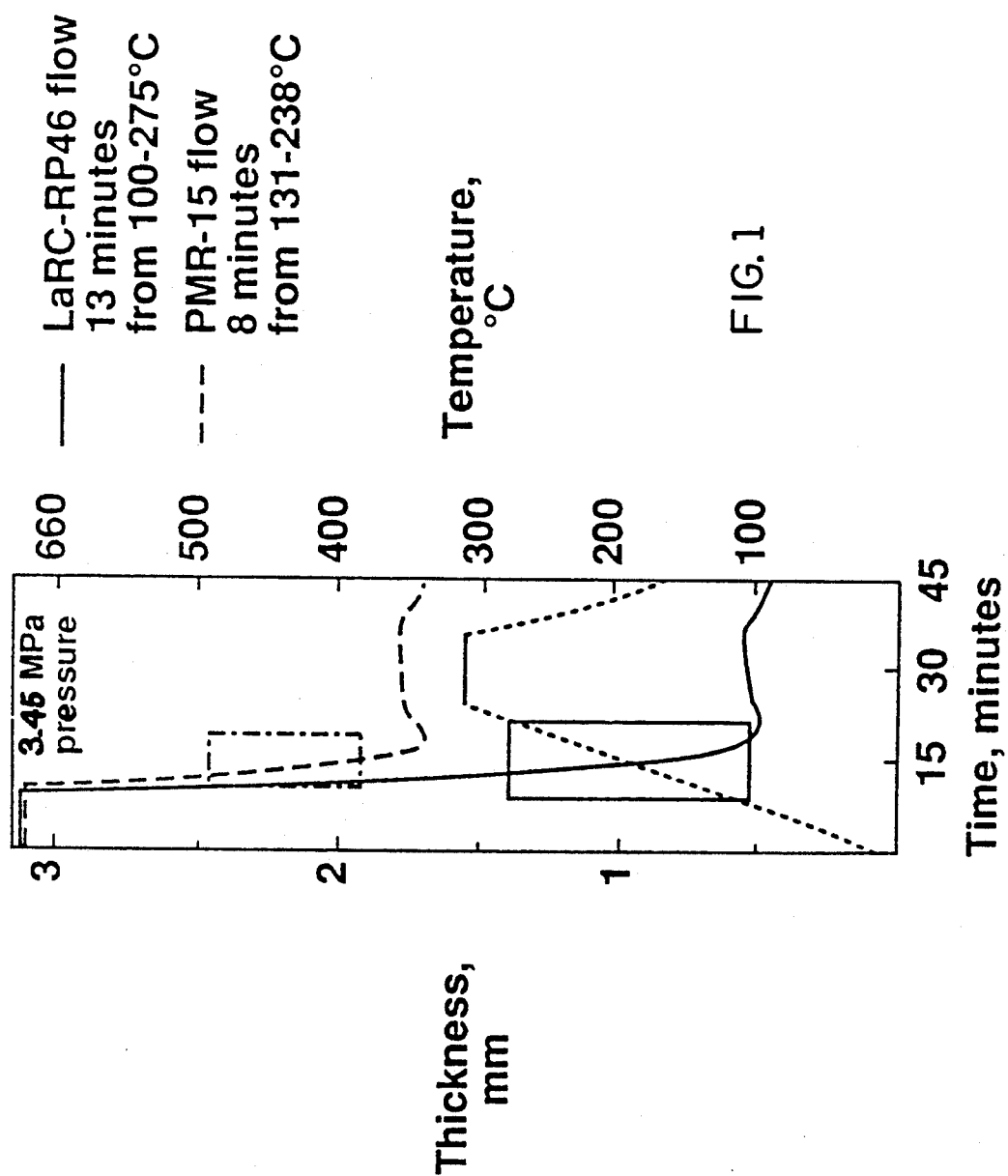
FIG. 1 is a plot of prepreg thickness as a function of time and temperature, comparing prepreg squeeze flow behavior between LaRC-RP46 and PMR-15.

The general reaction sequence for the PMR polyimide of the present invention is represented by the following equation:

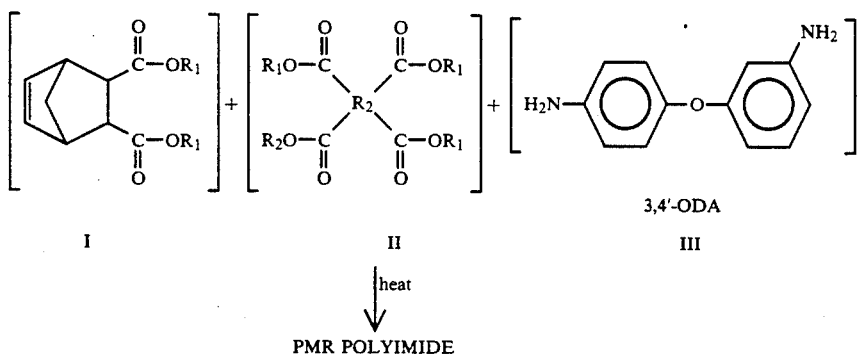

I  II  III 3,4'-ODA

↓ heat

PMR POLYIMIDE wherein $R_1$ is hydrogen or alkyl and $R_2$ is a tetravalent aryl radical. Several aromatic dianhydrides are either commercially available or they can be prepared by a known synthesis. These dianhydrides can be readily converted into the corresponding tetracarboxylic acids (II, wherein $R_1$ is hydrogen only) by hydrolysis. Also, by reacting with an alcohol, these dianhydrides can be easily transformed into their alkyl ester derivatives (II, -continued

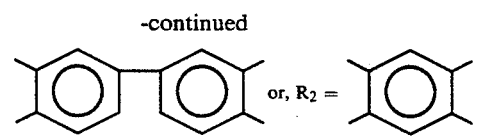

Excellent results have been achieved wherein the equation is as follows:

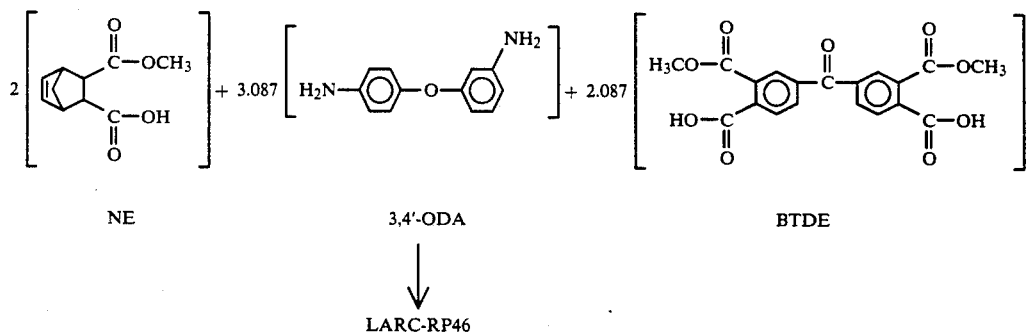

NE  3,4'-ODA  BTDE

↓

LARC-RP46 wherein $R_1$ has no, one, two and/or three hydrogens). These derivatives of the aromatic dianhydrides can be used to react with a nadic compound (I) and 3,4,'-oxydianiline to form a PMR polyimide of the present invention. Particularly preferred is a PMR polyimide wherein:

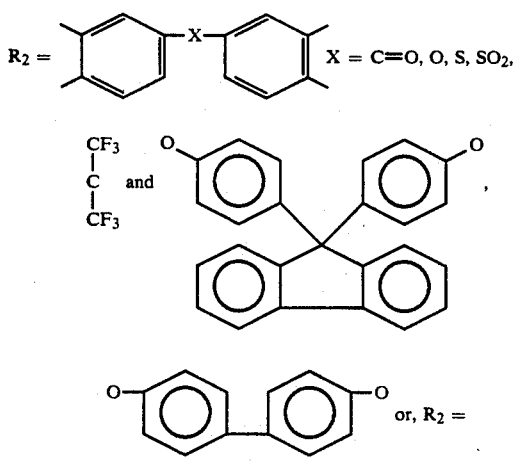

As discussed in the Background of the Invention above, 3,4'-ODA is at least potentially less toxic than MDA. As well, 3,4'-ODA contains an ether linkage coupled with a meta isometric amine group, which causes it to be extremely flexible. When this flexible diamine is incorporated into the PMR polyimide backbone good resin flow results, which, in turn, improves processability. Moreover, this flexibility provides toughness to the new polyimide.

The novel PMR polyimides of the present invention are also extremely stable. It is possible that the present PMR polyimide system forms a biphenyl bridge through a coupling of phenyl free radicals, when treated at a high temperature, such as 371° C., as shown below:

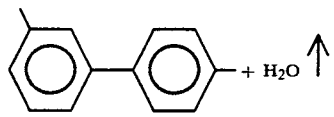

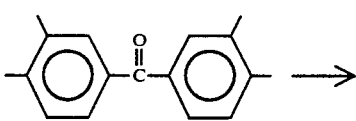

Water is the by-product of this reaction. This reaction is likely promoted by the combination of two factors: One is the presence of a nadic endgroup which initiates free radicals and the other is the presence of a weak and flexible meta ether linking group, which ether bond is susceptible to a homolytic cleavage. This biphenyl bridge could enhance the thermo-oxidative stability of the polyimide. The formation of a biphenyl fragment has been proposed in the thermo-oxidative degradation of polyimides. Supporting data for this theory is presented in the examples.

EXAMPLES OF BIPHENYL FORMATION

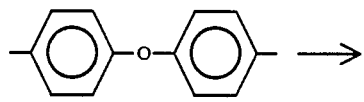

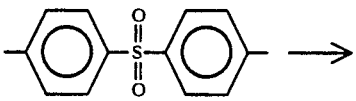

(b) Skybond 700

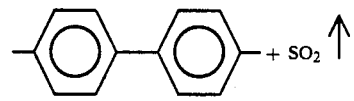

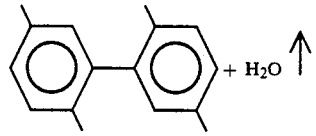

(a) Kapton (c) PMDA/4,4'-DDS

Accordingly, the novel PMR polyimides of the present invention have two unique advantages: Initially, the incorporation of 3,4'-ODA offers ease of processing and good toughness. Later, when treated at a high temperature, the less stable and flexible ether linkage of 3,4'-ODA is converted into a more stable and rigid polymer containing a biphenyl bridge.

Thus, it is possible that the present PMR polyimide has two general chemical structures. One is a polyimide structure containing a flexible ether connecting group which is formed by application of heat at 316° C. or below as shown by the following equation:

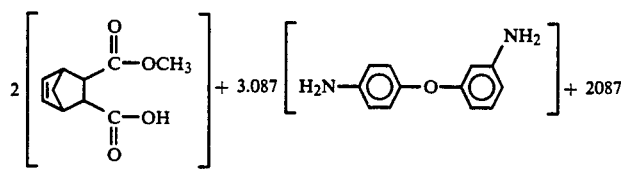

NE          3,4'-ODA

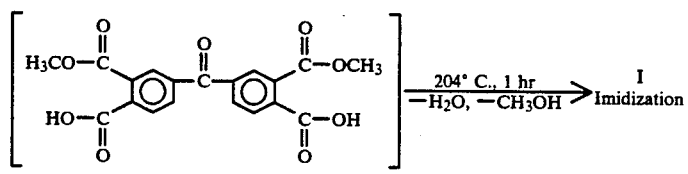

BTDE

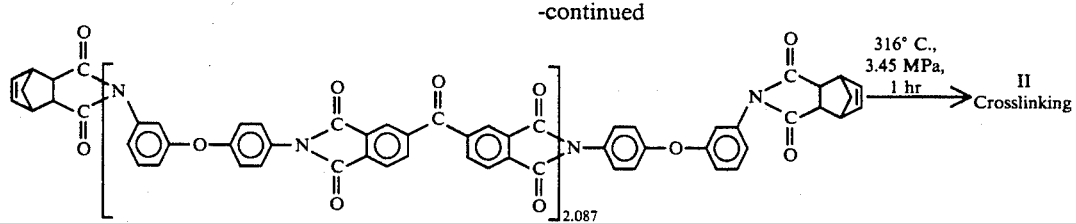

LaRC-RP46 prepolymer

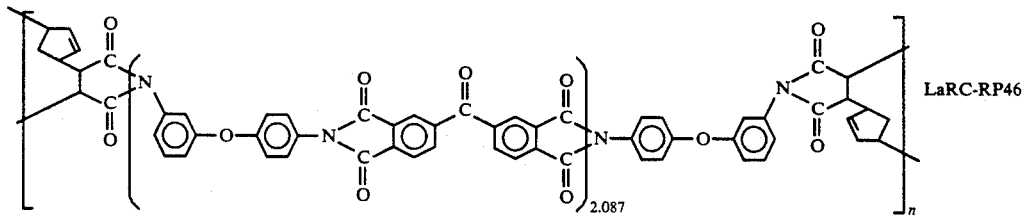

Polyimide containing an ether linkage

The other is a polyimide structure containing a rigid biphenyl bridge formed from the previous ether containing polyimide by application of heat above 316° C., especially, at 371° C. The reaction is shown below:

The PMR polyimide of this invention is adapted for use as a composite matrix and as an adhesive and molding compound suitable for aerospace and aircraft engine

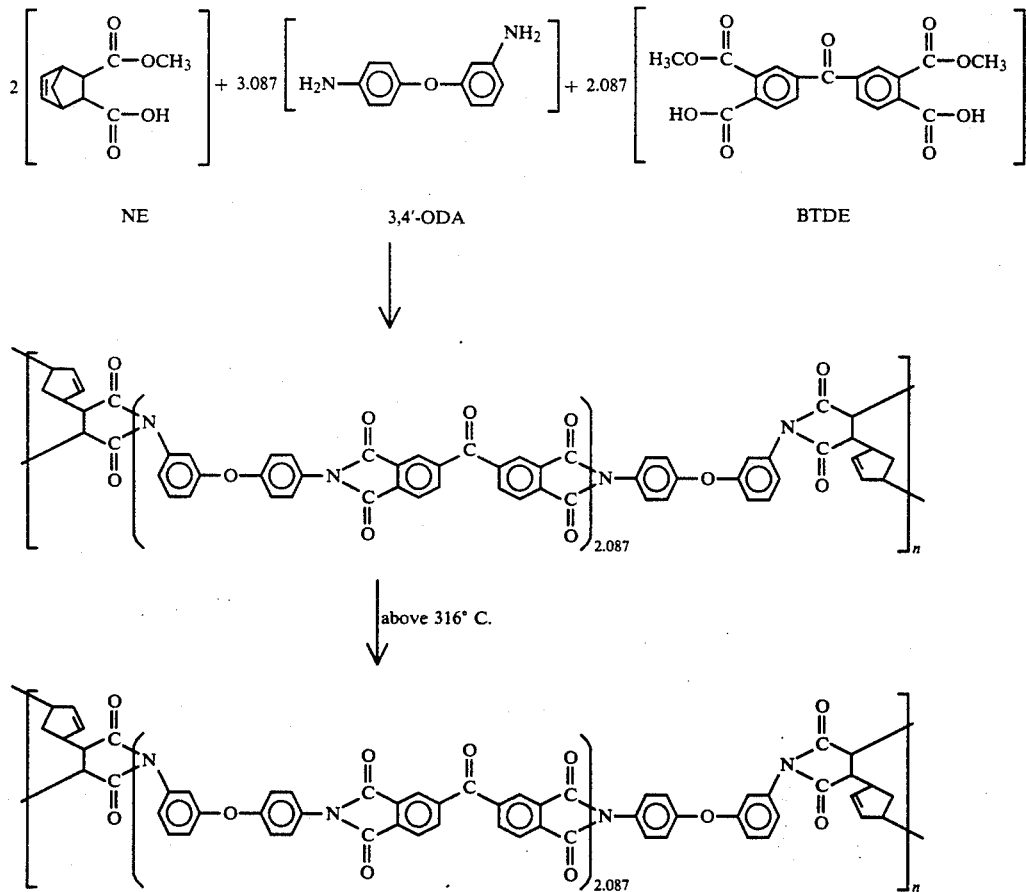

Polyimide containing a biphenyl bridge structural and weapon system applications at temperatures above 300° C.

The following are examples that illustrate preparation and use of the PMR polyimides for application in advanced composites. However, it is to be understood that the examples are merely illustrative and intended to enable those skilled in the art to practice the invention in all of the embodiments flowing therefrom and do not in any way limit the scope of the invention as defined in the claims.

EXAMPLES

1. Preparation of Celion 6000/LaRC-RP46 Composite

The following is a typical procedure for fabricating a unidirectional Celion 6000/LaRC-RP46 composite. To 320.5116 g of a 50 weight percent methanol solution of dimethyl ester of 3,3',4,4'-benzophenonetetracarboxylic acid (BTDE) (160.2558 g, 0.4152 mole) was added 122.8564 g (0.6143 mole) of 3,4'-oxydianiline (3,4'-ODA), 78.0000 g (0.3980 mole) of monomethyl ester of 5-norbornene-2,3-dicarboxylic acid (NE) and 379.6395 g of anhydrous methanol. The mixture was stirred at room temperature for one-half hour to give a 40 weight percent LaRC-RP46 monomer solution. This brown solution was used to prepare prepreg by drum winding unsized Celion 6K graphite fibers. The prepreg exhibited excellent tack and drape characteristics. Prepreg tapes were dried on the rotating drum at room temperature for 16 hours, removed from the drum and cut into 7.6 cm by 15.3 cm plies. Twelve plies were stacked unidirectionally and then staged at 204° C. for one hour in an air-circulating oven. The staged lay-up was placed in a cold matched metal die. This was then inserted into a preheated 316° C. press. A thermocouple was attached to the matched die to determine temperature history. When the die temperature reached 232° C., 3.45 MPa (500 psi) pressure was applied. The temperature was raised to 316° C. at a rate of 4° C./minute. The composite was cured at 316° C. in air at 3.45 MPa pressure for one hour and removed from the press when the die temperature reached 177° C.

The apparent Tgs of all composites were determined by a DuPont Model 940 Thermal Analyzer (TMA). The isothermal aging studies both at 316° C. and at 371° C. were made using precut flexural and interlaminar shear specimens. The precut flexural specimens were used to determine weight loss as a function of the aging time at 316° C. and 371° C. The flexural tests were performed in accordance with ASTM D790. Interlaminar shear strengths were measured following ASTM D2344 specifications. For elevated temperature mechanical testing the thermocouple was placed near the test sample so that the testing temperature closely reflected the sample temperature. Also, the temperature calibration was made daily to ensure the accuracy of the testing temperature. Each of the mechanical properties reported represents an average of three samples. The fiber and resin volume percent were determined following ASTM D-3171 procedure.

2. Composite Processing Study

To study the squeeze flow behavior, the dried prepreg (staged one hour at 204° C.) was cut into 2.54 cm by 2.54 cm size and stacked 12 ply unidirectionally. A parallel-plate plastometer was used to measure sample deformation as a function of time and temperature, using 3.45 MPa (500 psi) pressure. For comparison purposes, a PMR-15 prepreg was also prepared and tested, along with the LaRC-RP46 counterpart.

FIG. 1 compares the prepreg squeeze flow characteristics between LaRC-RP46 and PMR-15. It is evident that the new material exhibited better flow and a broader processing window than PMR-15. The LaRC-RP46 prepreg remained in a fluid state up to 275° C., whereas the PMR-15 materials solidified at 238° C.

Since ability to reproduce high quality composite laminate is considered an important feature, five composite panels were fabricated, using the standard cure cycle (one hour at 316° C. and 3.45 MPa pressure). The results shown in Tables 1 and 2 suggest that LaRC-RP46 is readily processed into a high quality composite with excellent reproducibility. Outstanding processability of LaRC-RP46 is further supported by the data given in Tables 3 and 4. Despite variations both in processing parameters (Table 3) and in postcuring conditions (Table 4), high quality laminates were produced. Also, no blister formation or composite delamination was obserbed after postcure at the three different conditions listed in Table 4. The postcure conditions have profound effects on composite $T_g$ and mechanical properties especially at elevated temperature. This is expected. What is not expected, however, is the dramatic enhancements in the composite $T_g$ and 371° C. mechanical properties when postcured at 371° C. in air (Table 4).

TABLE 1

REPRODUCIBILITY OF LaRC-RP46 UNIDIRECTIONAL COMPOSITE FABRICATION

| Composite[a] System | Dimensions in cm | C-scan | Density, g/cm$^2$ | Volume, % | | |
|---|---|---|---|---|---|---|
| | | | | Fiber | Resin | Void |
| I[b] | 7.6 × 15.3 × 0.2 | Excellent | 1.56 | 53 | 47 | 0 |
| II[b] | 7.6 × 15.3 × 0.2 | Excellent | 1.57 | 56 | 44 | <1 |
| III[c] | 7.6 × 15.3 × 0.2 | Excellent | 1.58 | 54 | 46 | 0 |
| IV[b] | 7.6 × 15.3 × 0.4 | Excellent | 1.56 | 53 | 46 | 1 |
| V[b] | 7.6 × 15.3 × 0.4 | Excellent | 1.56 | 54 | 47 | <1 |

[a]All composite systems were cured 1 hr at 316° C. under 3.45 MPa (500 Psi) pressure;
[b]Postcured 16 hrs at 316° C.;
[c]Postcured 24 hrs at 325° C.

TABLE 2

REPRODUCIBILITY OF LaRC-RP46 UNIDIRECTIONAL COMPOSITE FABRICATION

| Composite[a] System | Room Temperature Mechanical Properties | | |
|---|---|---|---|
| | Flexural Strength MPa/Ksi | Flexural Modulus GPa/Msi | Interlaminar Shear Strength MPa/Ksi |
| I[b] | 1724/250 | 90/13 | 131/19 |

TABLE 2-continued

REPRODUCIBILITY OF LaRC-RP46 UNIDIRECTIONAL COMPOSITE FABRICATION

| Composite[a] System | Room Temperature Mechanical Properties | | |
|---|---|---|---|
| | Flexural Strength MPa/Ksi | Flexural Modulus GPa/Msi | Interlaminar Shear Strength MPa/Ksi |
| II[b] | 1676/243 | 83/12 | 131/19 |
| III[c] | 1173/170 | 69/10 | 104/15 |

[a]All composite systems were cured 1 hr at 316° C. under 3.45 MPa (500 Psi) pressure;
[b]Postcured 16 hrs at 316° C.;
[c]Postcured 24 hrs at 325° C.

TABLE 3

EFFECTS OF PROCESSING PARAMETERS ON COMPOSITE PARAMETERS

| Processing Parameter | Composite Parameters | | | |
|---|---|---|---|---|
| | C-scan | Density, g/cm² | Volume, % Fiber | Resin | Void |
| I Pressurization temperature 189° C. 1 hr at 316° C./ 3.45 MPa | Excellent | 1.58 | 54 | 46 | 0 |
| II Pressurization temperature 200° C. 1 hr. at 316° C./ 3.45 MPa | Excellent | 1.58 | 54 | 46 | 0 |
| III Pressurization temperature 232° C. 1 hr. at 316° C./ 3.45 MPa | Excellent | 1.59 | 55 | 45 | 0 |
| IV Pressurization temperature 232° C. 1 hr. at 325° C./ 3.45 MPa | Excellent | 1.57 | 54 | 46 | 0 |

TABLE 4

EFFECT OF POSTCURE ON COMPOSITE PHYSICAL AND MECHANICAL PROPERTIES

| Composite Property | After Postcure | | |
|---|---|---|---|
| | 16 hrs at 316° C. | 24 hrs at 325° C. | 4 hrs each at 316° C., 343° C. and 371° C. |
| Tg, °C. | 320 | 335 | 397 |
| C-scan | Excellent | Excellent | Excellent |
| Flexural strength MPa/Ksi | | | |
| 25° C. | 1724/250 | 1173/170 | 1186/172 |
| 316° C. | 414/60[b] | 917/133[c] | — |
| 371° C. | — | 522/80[c] | 793/115[c] |
| Flexural modulus GPa/Msi | | | |
| 25° C. | 91/13.2 | 71/10.2 | 71/10.2 |
| 316° C. | 39/5.7[b] | 51/7.4[c] | — |
| 371° C. | — | 39/5.6[c] | 60/8.7[c] |
| Interlaminar shear strength, MPa/Ksi | | | |
| 25° C. | 131/19.0 | 101/14.6 | 97/14.0 |
| 316° C. | 188/27.2[b] | 51/7.4[c] | — |
| 371° C. | — | — | 33/4.7[c] |

[a]Tgs 263 & 301° C. before postcure;
[b]Yielded by thermoplastic deformation;
[c]no thermoplastic failure.

3. Composite Fracture Toughness

The composite interlaminar fracture toughness was determined by the standard double cantilever beam (DCB) test method.

Two unidirectional 7.6 cm by 15.3 cm by 0.4 cm composite panels with a 3.3 cm long 12-μm thick polyimide film crack starter at the midplane at one end was prepared using the standard cure cycle given in Example 1. The panels were postcured at 316° C. for 16 hours in air. After ultrasonic C-scan, which showed no voids or defects, the panels were cut into three double cantilever beam specimens (2.50 cm by 15.3 cm by 0.4 cm). The specimens were aged at 316° C. for various time intervals. The unaged and the aged specimens were pin-loaded via 2.50 cm aluminum blocks and tested at a 0.13 cm/min crosshead speed. Fracture toughness values were calculated from $$G_{IC} = \frac{2P^2 a^2 \cdot m}{2b}$$

where P is the fracture load, a is the crack length, b is the specimen width and m is the slope of the plot of compliance against the cube of crack length.

Figure 2:
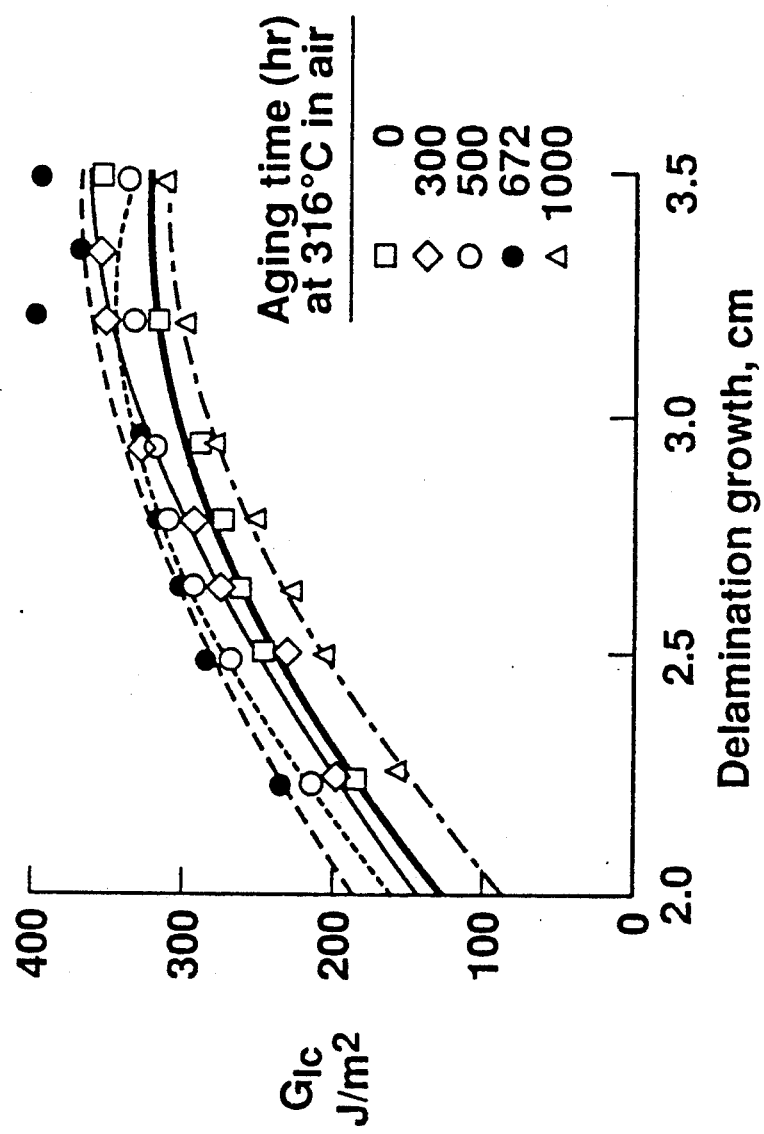
FIG. 2 is a plot of composite fracture energy ($G_{Ic}$) as a function of composite delamination growth for Celion 6K/LaRC-RP46.

Table 5 summarizes the toughness properties. In a steady state, an initial $G_{Ic}$ value of 301 J/m² was obtained, which represents a 108% increase when compared to a value of 145 J/m² reported for PMR-15 counterpart. The $G_{Ic}$ value increased with increasing aging time at 316° C. up to 672 hours and then decreased. This is accompanied by a transition from a fiber-matrix interfacial failure to a matrix failure. It is commonly observed that, as the crack proceeds, the $G_{Ic}$ increases dramatically. FIG. 2 shows plots of $G_{Ic}$ vs delamination growth for the unaged and aged specimens.

TABLE 5

COMPOSITE FRACTURE TOUGHNESS AT ROOM TEMPERATURE

| | $G_{Ic}$, Jm²[a] | | |
|---|---|---|---|
| Aging time (hr) at 316° C. in air | Celion 6K/LaRC-RP46 | | Celion 6K/PMR-15 |
| | Initiation | Steady state | Steady State |
| 0 | | | |
| Before postcuring | 176 | 291 | — |
| After postcuring at 316° C. for 16 hrs | 172 | 301 | 145[b] |
| 300 | 172 | 327 | — |
| 500 | 199 | 318 | — |
| 672 | 226 | 392 | — |
| 1000 | 103 | 262 | — |

[a]By double cantilever beam testing
[b]P. Delvigs, Polymer Composites, 10(2), 134 (1989)

Figure 3:
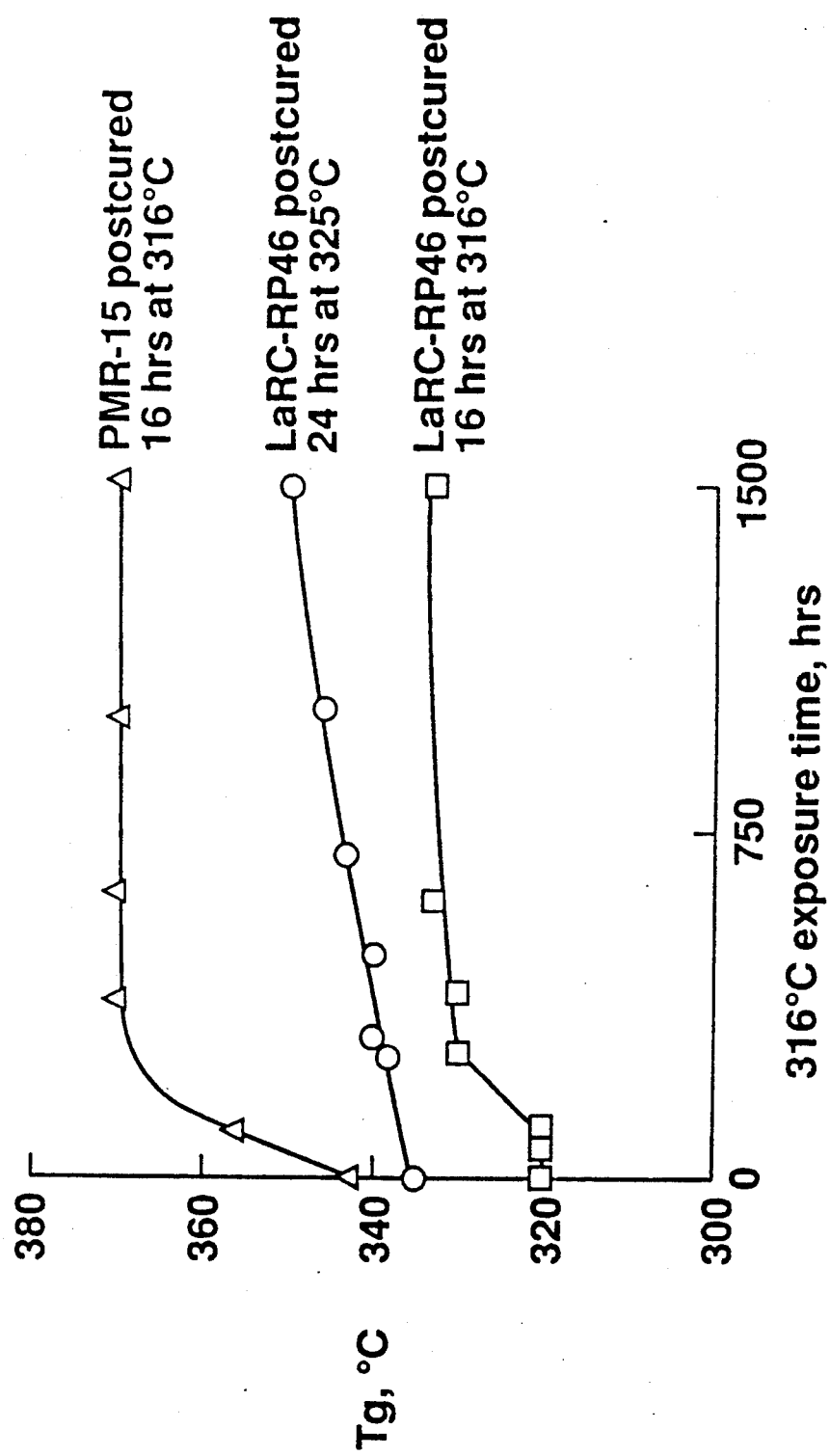
FIG. 3 is a plot of composite glass transition temperature (Tg) as a function of thermo-oxidative exposure time at 316° C. in air for Celion 6K/LaRC-RP46 and comparing to PMR-15 counterpart.
Figure 4:
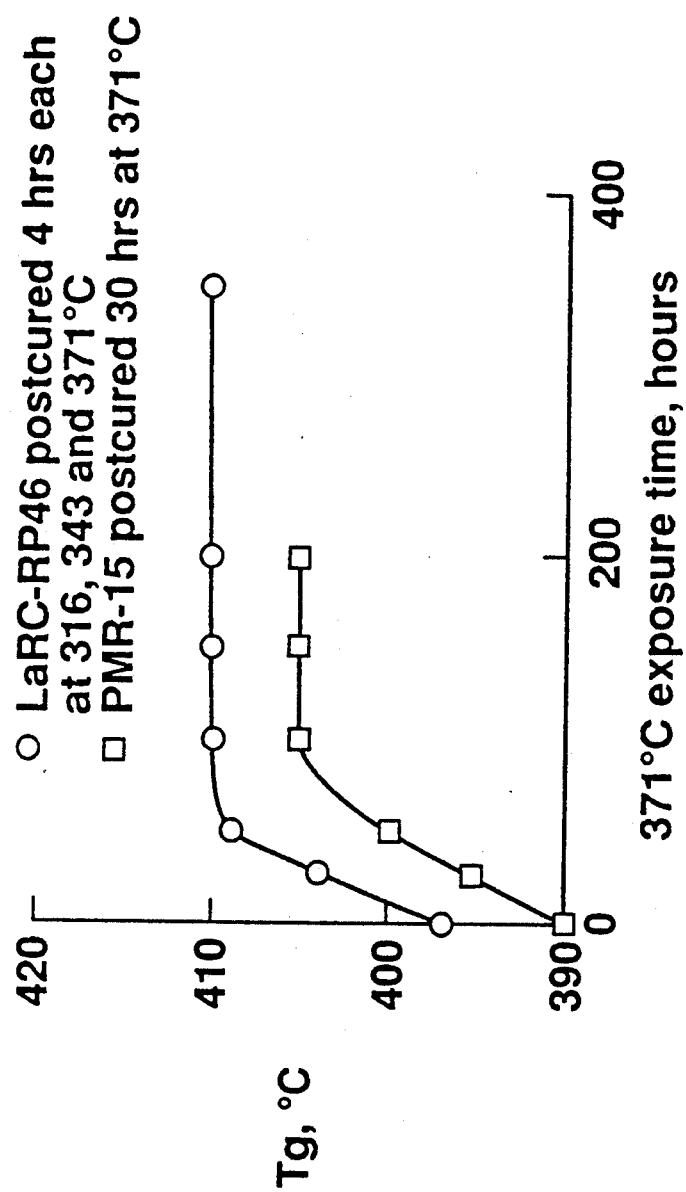
FIG. 4 is a plot of composite glass transition temperature (Tg) as a function of thermo-oxidative exposure time at 371° C. in air for Celion 6K/LaRC-RP46 and comparing to PMR-15 counterpart.

4. Composite Thermo-oxidative Stability $T_g$ is known to significantly affect elevated temperature mechanical properties of PMR composites. FIG. 3 compares plots of composite $T_g$ vs aging time at 316° C. for LaRC-RP46 and PMR-15. It is clear that PMR-15 had a significantly higher $T_g$ than LaRC-RP46, when aged at 316° C. However, the opposite is true, as shown in FIG. 4, when the composites are exposed at 371° C. The maximum $T_g$ obtained for LaRC-RP46 was 410° C., compared to 405° C. for PMR-15.

Figure 5:
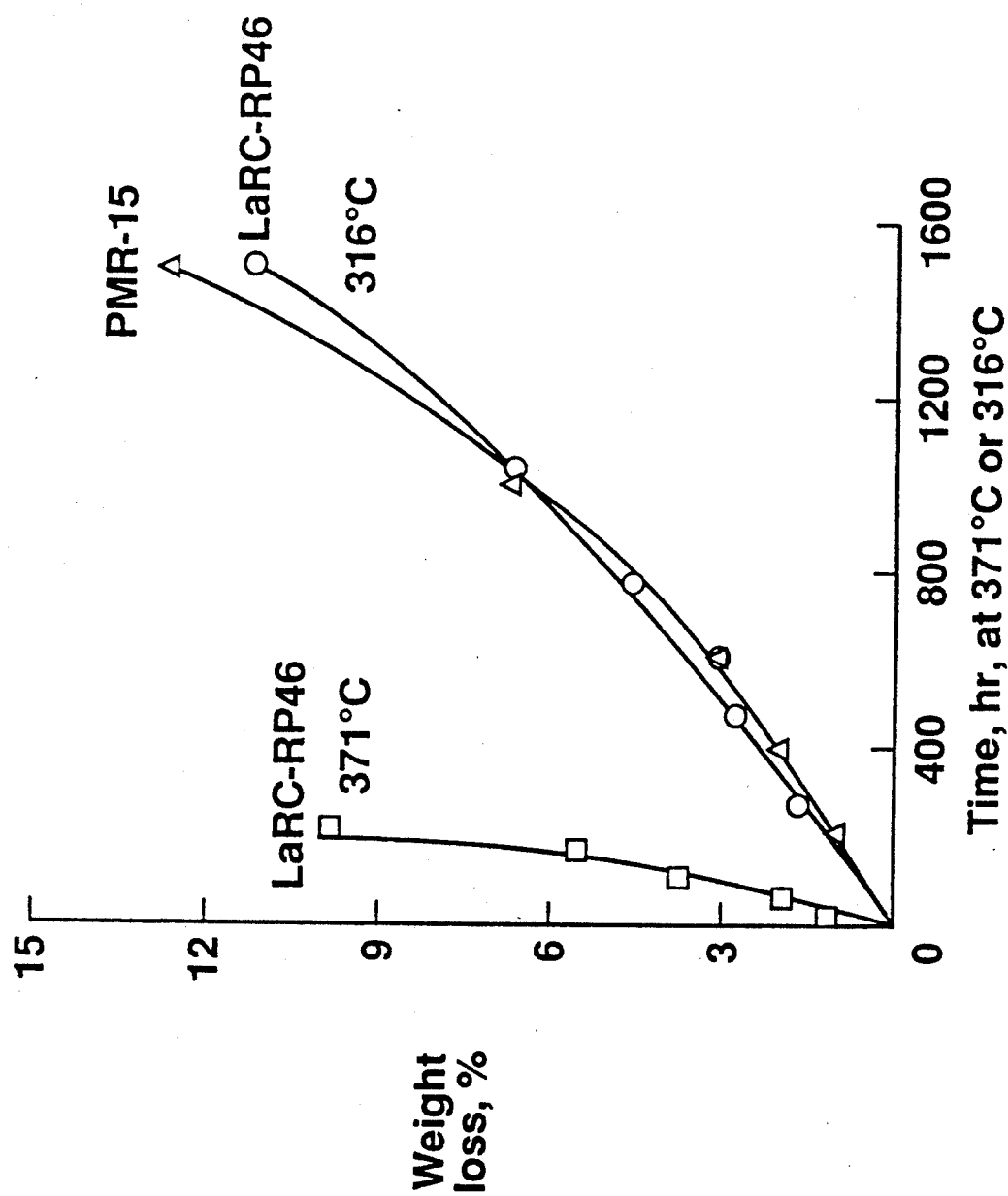
FIG. 5 is a plot of composite weight loss as a function of thermooxidative exposure time at both 316° C. and 371° C. for Celion 6K/LaRC-RP46 and comparing to PMR-15 counterpart.

Table 6 summarizes the 316° C. composite mechanical properties of LaRC-RP46. The composite retains excellent mechanical properties at 316° C. in air. The initial flexural and interlaminar shear strengths were 133 and 7.4 ksi, respectively. After 1500 hours, the composite retained 69 and 85% of the original properties. The weight loss data of FIG. 5 confirms that LaRC-RP46 has thermo-oxidative stability equivalent to PMR-15. This is true at 316° C. However, at 371° C., LaRC-RP46 exhibited significantly higher thermo-oxidative stability than PMR-15.

TABLE 6

316° C. COMPOSITE MECHANICAL PROPERTIES

| | 316° C. Mechanical Properties | | |
|---|---|---|---|
| Aging time (hr) at 316° C. in air | Flexural strength MPa/Ksi | Flexural modulus GPa/Msi | Interlaminar shear strength, MPa/Ksi |
| 0 | 917/133 | 49/7.4 | 51/7.4 |
| 260 | 986/143 | 72/10.4 | 44/6.4 |
| 478 | 800/116 | 68/9.9 | 34/4.9 |
| 1012 | 717/104 | 59/8.5 | 29/4.2 |
| 1500 | 635/92 | 62/9.0 | 44/6.3 |

Significantly higher thermo-oxidative stability of LaRC-RP46 composite at 371° C. compared to PMR-15 and other existing PMR polyimide composite systems is evident from the 371° C. composite mechanical properties shown in Tables 7 and 8. The 371° C. initial flexural and interlaminar shear strengths of Celion 6k/LaRC-RP46 were 115 and 4.7 ksi, respectively (Table 7). The composite retained 90 and 100% of the original strengths after aging 100 hours at 371° C. in air. After 200 hours, the composite still retained significantly greater than 50% of the original properties, suggesting a useful life of more than 200 hours at 371° C. in air. These 371° C. flexural properties represent a remarkable improvement, when compared to the reported values for the existing PMR polyimide composite systems, such as PMR-15, PMR-II-50, V-CAP-50 and AF-R-700B (Table 8). Such high thermo-oxidative stability exhibited by LaRC-RP46 is rarely observed in other high temperature polymers.

TABLE 7

371° C. COMPOSITE MECHANICAL PROPERTIES

| | 371° C. Mechanical Properties | | |
|---|---|---|---|
| Aging time (hr) at 371° C. in air | Flexural strength MPa/Ksi | Flexural modulus GPa/Msi | Interlaminar shear strength, MPa/Ksi |
| 0 | 793/115 | 60/8.7 | 32.4/4.7 |
| 49 | 724/105 | 60/8.7 | 46.2/6.7 |
| 100 | 710/103 | 62/8.9 | 33.8/4.9 |
| 150 | 579/84 | 53/7.6 | 31.0/4.5 |
| 200 | 655/95 | 50/7.2 | 24.8/3.6 |

TABLE 8

COMPARISON OF 371° C. COMPOSITE MECHANICAL PROPERTIES

| | 371° Composite Mechanical Properties | | | |
|---|---|---|---|---|
| | Flexural strength, MPa/Ksi | | Interlaminar shear strength, MPa/Ksi | |
| Composite system | 0 hr | After 100 hrs at 371° C. in air | 0 hr | After 100 hrs at 371° C. in air |
| Celion 6K/ LaRC-RP46 | 793/115 | 710/103 | 32.4/4.7 | 38.8/4.9 |
| Celion 6K/ PMR-15[a] | 317/46 | 310/45 | 21.4/3.1 | 24.8/3.6 |
| T40R/ | 320/47 | 350/51 | 20.0/2.9 | 28.0/4/1 |

TABLE 8-continued

COMPARISON OF 371° C. COMPOSITE MECHANICAL PROPERTIES

| | 371° Composite Mechanical Properties | | | |
|---|---|---|---|---|
| | Flexural strength, MPa/Ksi | | Interlaminar shear strength, MPa/Ksi | |
| Composite system | 0 hr | After 100 hrs at 371° C. in air | 0 hr | After 100 hrs at 371° C. in air |
| PMR-II-50[b] T40R/ V-CAP-50[b] | 190/28 | 310/45 | 20.0/2.9 | 23.0/3.3 |
| Quartz/ AF-R-700B[c] | 421/61 | 393/57 | 51.7/7.5 | 35.9/5.2 |

[a]Pater, proceedings of the 1982 SPE ANTEC, 379 (1982)
[b]Vannucci et. al., proceedings of the 22nd SAMPE Tech. Conf., 22, 175 (1990)
[c]Serafini, et. al., ibid, in proceedings of the closed session, p. 96.

5. Preparation of LaRC-RP46 Neat Resin

To prepare a neat resin, the monomer solution of Example 1 was concentrated at 70° C. in $N_2$ atmosphere for four hours and then staged at 232° C. in air for one hour. This afforded a brown molding powder. Approximately 15.0 g of this molding powder was cured at 316° C. for one hour at 1000 psi pressure. This resulted in a 3.18 cm by 3.18 cm by 0.85 cm neat resin which had a density of 1.35 g/cc and showed no apparent voids or defects. The resin was not postcured and was cut into four compact tension specimens. The fracture energy ($G_{Ic}$) of this neat resin was determined by compact tension testing following ASTM 399 specifications. The $G_{Ic}$ value reported represents an average of four determinations. Following the same conditions, PMR-15 neat resin was also prepared and tested for comparison purposes. The neat resin apparent $T_g$'s for both LaRC-RP46 and PMR-15 were determined by a DuPont Model 940 Thermal Analyzer (TMA).

Figure 6:
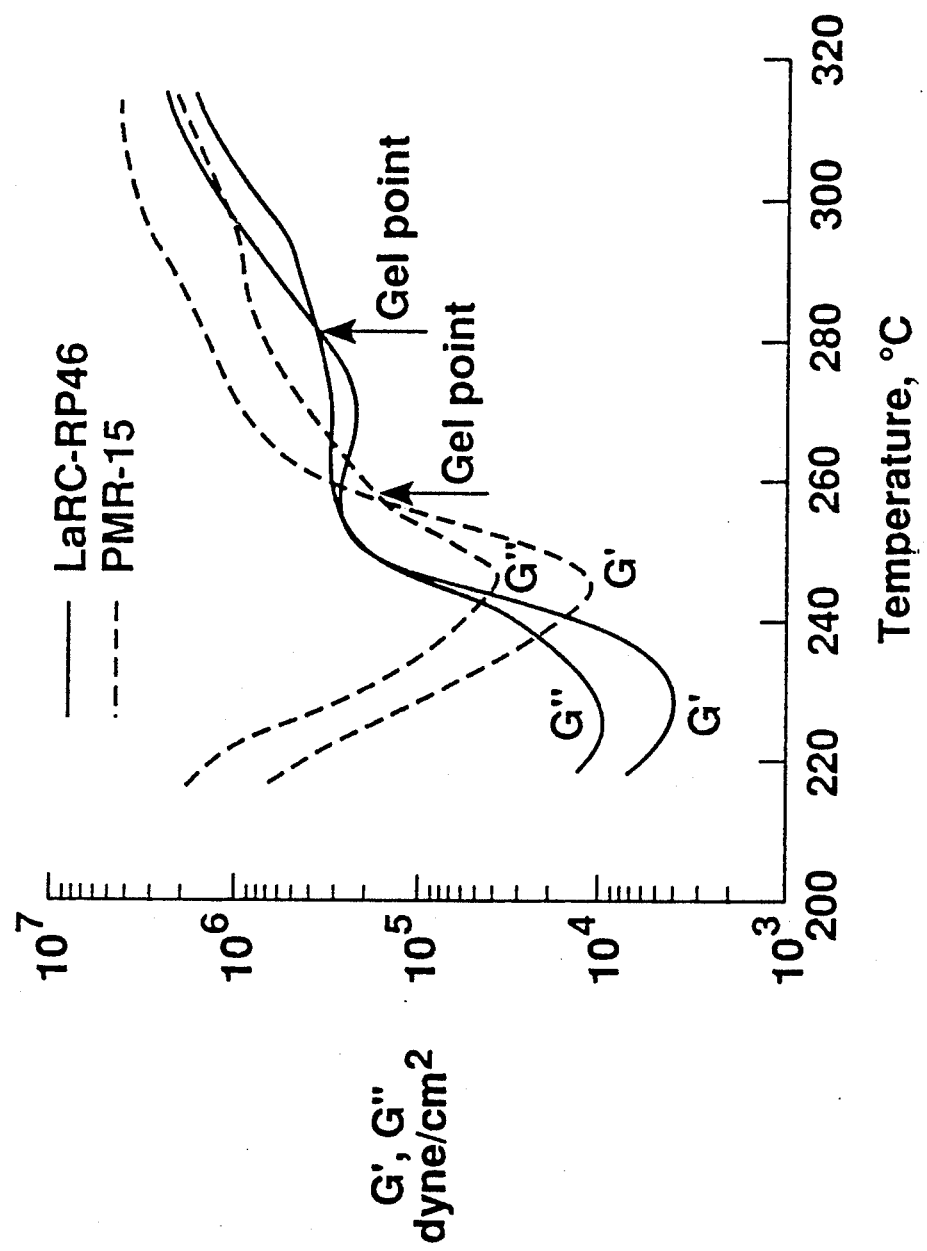
FIG. 6 is a plot of shear storage modulus (G') and loss modulus (G") as a function of temperature, comparing the rheological properties of molding powders between LaRC-RP46 and PMR-15.

Table 9 compares the neat resin properties between LaRC-RP46 and PMR-15. Like the composite, LaRC-RP46 neat resin shows notable improvement in fracture toughness, compared to PMR-15. To study the rheological properties of LaRC-RP46 and PMR-15, approximately 0.5 g of each molding powder, which preparation had been described earlier, was molded into a disk having 2.54 cm diameter and 0.1 cm thickness. The disk was placed between parallel plates which were preheated to 110° C. After three minutes, the sample was subjected to oscillatory shear at constant frequency of 10 radians/second and 0.3 percent strain. Heating rate was 2° C./minute. The storage modulus (G') loss modulus (G") and tan δ were recorded over the temperature range 110°–450° C. The data presented in FIG. 6 clearly shows that LaRC-RP46 has better resin flow than PMR-15, confirming that LaRC-RP46 has better prepreg flow than PMR-15, as discussed earlier in Example 2 above.

TABLE 9

| NEAT RESIN PROPERTIES[a] | | |
|---|---|---|
| Property | LaRC-RP46 | PMR-15[b] |
| Density | 1.35 | 1.33 |
| Tg, °C. | 265 | 315 |
| Fracture toughness[c] $G_{Ic}$ J/m$^2$ | 202 | 87 |

[a]Cured 1 hr at 316° C. and no postcuring;
[b]R. H. Pater and M. D. Morgan, SAMPE J. 24 (5), 25 (1988);
[c]by compact tension testing.

6. Evidence for Formation of Biphenyl Bridge

Figure 7:
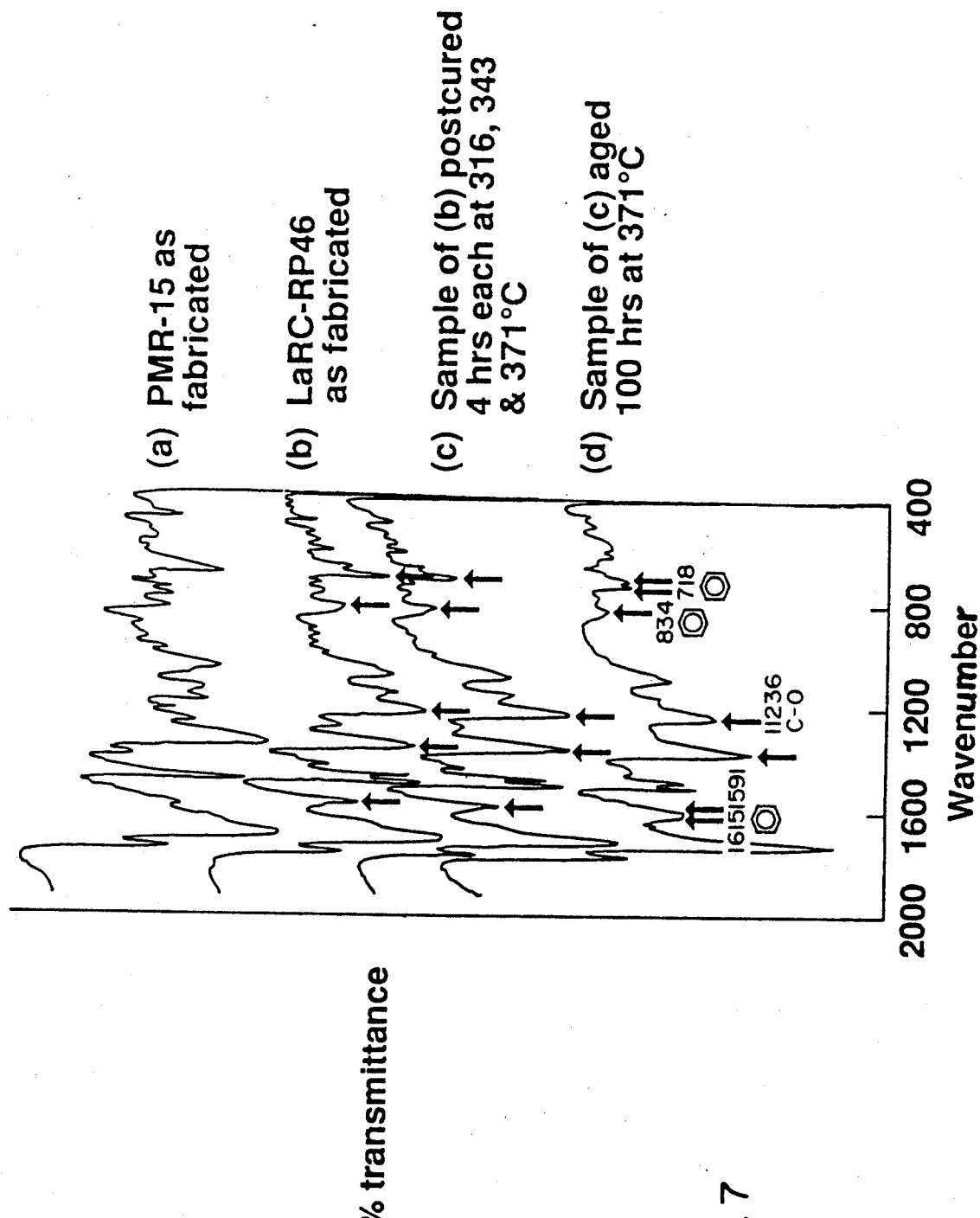
FIG. 7 is FTIR spectra of neat resins providing evidence supporting the formation of a biphenyl bridge in LaRC-RP46, when treated at an elevated temperature, such as 371°.

As discussed earlier in the Description of the Preferred Embodiments, it was proposed that the less stable, flexible ether linkage is chemically transformed into a rigid and more stable biphenyl group, when exposed at a high temperature, for example, 371° C. FTIR spectra shown in FIG. 7 provide direct evidence supporting the formation of such a biphenyl group. The absorption band at 1235 cm$^{-1}$ is due to the ether linkage (C-O). This band is absent in the PMR-15 neat resin spectrum shown in FIG. 7a. By comparing the three spectra of LaRC-RP46 shown in FIG. 7b, c and d, it is evident that the area under this band decreases with increasing exposure time at 371° C. This is particularly pronounced for the sample after 100 hours at 371° C. (FIG. 7d). Also, the bands at 1591, 835 and 718 cm$^{-1}$ changed when exposed at 371° C. This indicates that the chemical environment around the aromatic ring changed, possibly due to the formation of a biphenyl group.

What is claimed as new and desired to be secured by Letters Patent of the Unites States is:

1. The PMR polyimide comprising the reaction product of a mixture of the following monomer reactants:

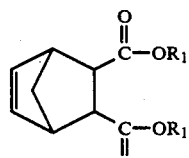

I wherein R$_1$ is hydrogen or alkyl;

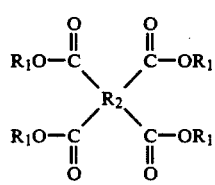

II wherein R$_1$ is hydrogen or alkyl, and R$_2$ is a tetravalent aryl radical;

and

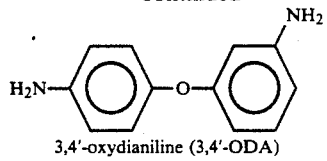

III 3,4'-oxydianiline (3,4'-ODA)

2. A PMR polyimide of claim 1, which has the following general structure:

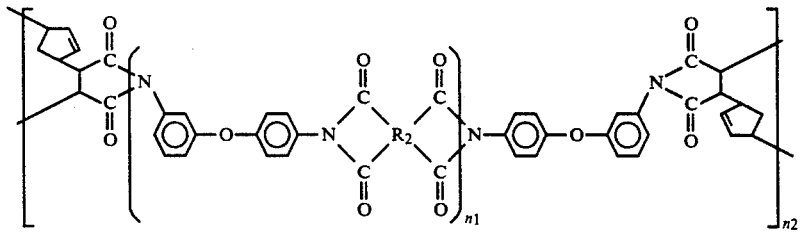

which is the reaction product formed by application of heat at or below 316° C.

3. A PMR polyimide of claim 1, which has the following general structure:

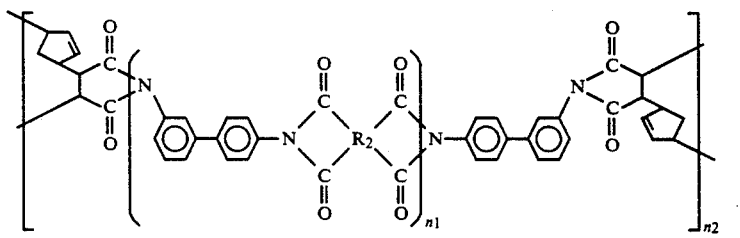

which is the reaction product formed by application of heat above 316° C.

4. The PMR polyimide of claim 1, wherein:

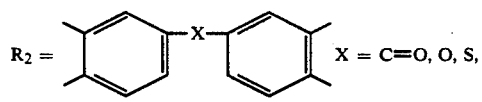

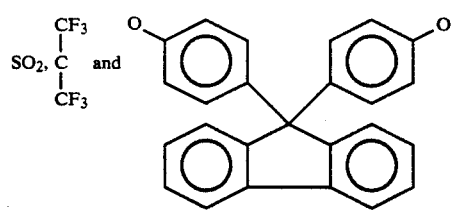

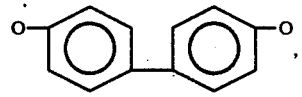

5. The PMR polyimide of claim 1, wherein:

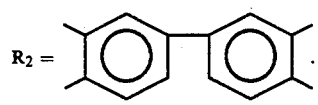

6. The PMR polyimide of claim 1, wherein:

$R_2 = $ 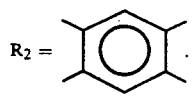

7. The PMR polyimide of claim 1, wherein the monomer reactants are:

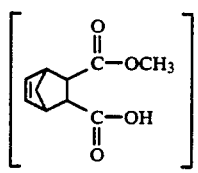

NE

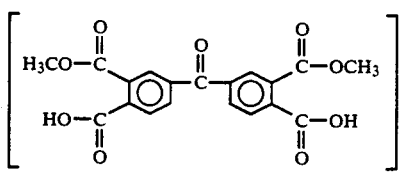

BTDE

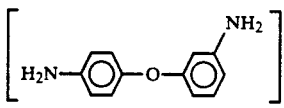

3,4'-ODA

8. The PMR polyimide of claim 1, wherein the molar ratio of the monomer reactants is 2:n:n+1, wherein n has a value from 1 to 50:

2(I):n(II):n+1(3,4'-ODA).

9. The PMR polyimide of claim 8, wherein n=2.087.

10. A process for preparing the PMR polyimide of claim 1, which process comprises reacting the following monomer reactants:

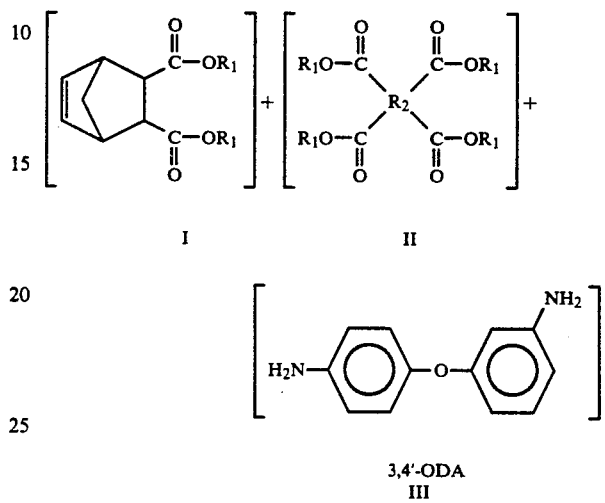

3,4'-ODA
III by application of heat.

11. A process according to claim 10, wherein the heat is applied at a temperature at or below 316° C.

12. A process according to claim 10, wherein the heat is applied at a temperature between 316° C. and 370° C.

13. A process according to claim 10, wherein the heat is applied at a temperature at or above 371° C.

14. A molding compound comprising the PMR polyimide of claim 1.

15. An adhesive composition comprising the PMR polyimide of claim 1.

16. A polymer matrix composite comprising the PMR polyimide of claim 1.

* * * * *